Feb. 4, 1964  K. PFLEIDERER  3,120,061
COUNTER-MICROMETER
Filed Dec. 1, 1959
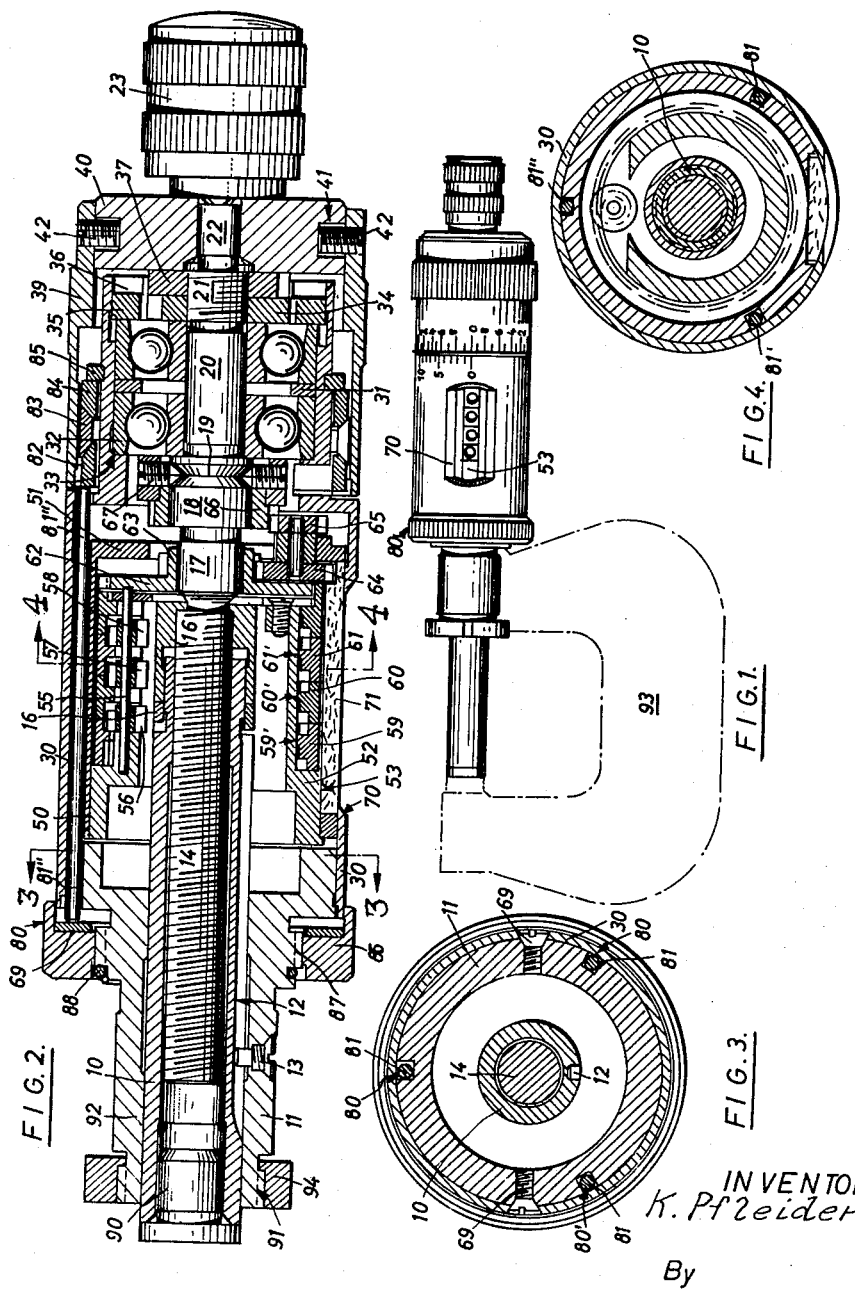
INVENTOR
K. Pfleiderer
By
Watson, Cole, Grindle & Watson
Attorneys

United States Patent Office 3,120,061
Patented Feb. 4, 1964

3,120,061
COUNTER-MICROMETER
Karl Pfleiderer, Erlenstrasse 17, Oberndorf
(Neckar), Germany
Filed Dec. 1, 1959, Ser. No. 856,575
Claims priority, application Germany June 11, 1959
10 Claims. (Cl. 33—166)

Counter-micrometers with longitudinally shiftable but non-rotatable measuring spindles are known. In one such instrument the spindle has a screw thread behind its solid guide part. A sleeve-like spindle nut which is rotatable but not shiftable engages this screw thread. A scale drum, serving as outer sleeve, rotates with this spindle nut and is rotatable on a stationary spindle guide sleeve which is rigidly connected with the front end cap of the measuring part which is likewise stationary. The spindle nut is turned by a ratchet. On the U-shaped arm, on which the spindle guide sleeve and front cap of the measuring part are mounted, there is a counter in the form of a measuring clock with hand and dial, which is driven by a friction wheel which is resiliently pressed against the measuring spindle in a longitudinal plane thereof. The dial shows the integers of the measuring units, whereas on the outer side of the front end cap and the scale drum there is a vernier scale on which the tenths and hundredths of the measuring units can be read.

The accuracy of measuring is here limited. Moreover, it is necessary to prolong the guided length of the measuring spindle onto the screw threaded portion thereof so that a special screw thread must be provided, which increases the cost of production. The counter in the form of a measuring clock requires a specially constructed arm for the gauge. The arrangement of the screw-threaded portion of the measuring spindle at the rear means either an extension of the spindle and consequently a lengthening of the instrument or, with normal spindle length, a shortening of the measuring range of the gauge.

A micrometer with counter is also known in which the counter is accommodated in the arm of the bow and driven by a toothed wheel on the rotatable measuring spindle. In this case a special construction is also necessary for the bow arm. As in this case the counter only drives number drums for the integers, tenths and hundredths of the measuring units a vernier reading is not possible.

Screw gauges with counters are likewise known which have a rotatable or screw measuring spindle and in which the counting mechanism is already accommodated within the measuring part, namely inside the rotary part thereof. In this case the counter only indicates the tenths of the measuring units while the integers can be read on the scale between the stationary base part of the instrument and the rotatable sleeve of the measuring part. The length of the measuring part is changeable during the measuring operation and the tenths scale therefore moves with it.

Now the object of the invention is to produce a counter-micrometer which avoids the shortcomings of the known instruments yet possesses their advantages. It is to have a wide measuring range in which it indicates tens, integers, tenths, hundredths and thousandths of the measuring units but does not change in length during the measuring operation. The counter which can be manufactured as a unit in special factories, is to be accommodated in a stationary measuring part, of sturdy construction and as simple and compact as possible, thereby keeping the cost of production as low as possible.

With this object in view a rotatable, non-shiftable screw spindle is arranged according to the invention on the new counter-micrometer with shiftable, non-rotatable measuring spindle, for shifting the measuring spindle, and the measuring spindle is made tubular so that the screw spindle projects into the measuring spindle. The mounting of the screw spindle is effected by two ring-shoulder ball bearings which are arranged side by side in such a manner that the measuring pressure is taken up by them in both directions. According to the invention, the drive of the counting mechanism is derived from the screw spindle. A spur wheel is mounted on the screw spindle and meshes with the first pinion of the counting mechanism drive. The counter is constructed as a unit and is preferably accommodated in a sleeve-shaped housing of the counter which is slipped into the outer shell and into which a carrier sleeve is inserted for the number drums. A shaft is mounted in the number drum carrier sleeve parallel to the measuring spindle, on which shaft indexing pinions for the number drums are aligned. The number drum carrier sleeve is preferably closed by a disc-shaped counter wheel which has on its hub teeth engaging the last pinion of the counting mechanism drive. The rear end of the measuring spindle which is drawn into the counter is provided with an external screw thread which carries an adjusting sleeve nut with counter nut. The stationary outer shell or sleeve is provided with a window opposite the number drums, which window is covered with a magnifying lens and preferably has an additional field for a supplementary notation. According to the invention, the screw spindle carries on its rear end a scale-carrying drum the shell of which is slipped from the rear on to the rear end of the outer sleeve with its outer surface flush with the outer surface of the outer sleeve, so that a zero line marked on the edge of the outer sleeve ensures parallax-free reading with a hundredths scale outside on the scale-carrier drum. A vernier scale is provided outside on the rear edge of the outer sleeve, which scale indicates thousandths of the measuring units. The likewise stationary measuring spindle-guide housing preferably carries at its front end the locking device for the measuring spindle. For this purpose, two pressure rings with inverse cross-sections are, according to the invention, slidably mounted on the reduced rear end of the outer sleeve and accommodate between their opposed bevelled end faces a split braking ring with correspondingly bevelled end faces, whereby the rear pressure ring is secured against shifting and several loose, shiftable pressure rods, uniformly distributed in a circle, bear against the front end face of the front pressure ring. These pressure rods are loosely fitted in longitudinal grooves in the wall of the measuring spindle-guide sleeve and of the counting mechanism housing and bear at the front against the rear end face of a set screw ring which is screwed on to a length of external thread on the housing of the spindle guide and secured against unintentional unscrewing. The effective rear face of the set screw ring is preferably provided with a covering ring disc.

The gauge arm, or in the case of built-in micrometers the existing receptacle, is slipped on to the front end of the measuring spindle-guide housing with the aid of a hole in one of its ends and secured in position by means of a nut which is screwed on to the foremost end of this housing provided with external screw thread. The front end of the hollow measuring spindle is preferably closed by means of a pressed-in measuring spindle fitting.

An embodiment of the new counter-micrometer is illustrated by way of example in the accompanying drawing, in which
FIG. 1 is a side view of the instrument;
FIG. 2 a longitudinal section thereof;
FIG. 3 a cross-section taken on line III—III of FIG. 2, and
FIG. 4 a cross-section taken on line IV—IV of FIG. 2.

The measuring spindle is designated by 10. It is tubular and guided in a spindle-guide housing 11. A longitudinal groove 12 is cut in the wall of the hollow measuring spindle 10 and the end of a guide screw 13, radially mounted in the spindle housing 11 and countersunk therein, projects into this groove 12. The measuring spindle 10 can therefore be shifted in longitudinal direction but does not, however, turn about its longitudinal axis. A screw spindle 14 serves for shifting the measuring spindle 10 and is provided on its outer side with a fine thread which engages a corresponding thread in the rear end of the measuring spindle 10. The rear end of the hollow measuring spindle 10 has an external thread on which a short sleeve 16 is screwed as adjusting nut. It is locked by a counter nut 16' and serves for adjusting the play of the engagement of the measuring spindle thread in the external screw thread on the screw spindle 14. The threaded portion of the screw spindle 14 merges into a reduced neck 17 which is followed by a collar 18 provided with an annular groove. This collar extends into a ball bearing seat 20 which is followed by a screw threaded portion 21. This passes into a reduced neck which carries the known ratchet 23.

An outer sleeve 30 is slipped on to the spindle-guide housing 11 from the rear end thereof and accommodates the counting mechanism and the bearing for the non-shiftable screw spindle 14. Two ball bearings 32 are mounted on the ball bearing seat 20 of the screw spindle 14 and separated by a spacer ring 31. Both ball bearings 32 are constructed as ring-shoulder ball bearings so that the front bearing can take up the measuring pressure towards the rear and the rear bearing the measuring pressure towards the front. The outer races of both ball bearings are located in an axial recess in the outer sleeve 30 and locked against displacement at the front by an inner shoulder 33 in the outer sleeve and at the rear by two disc nuts 34 and 35, the outer nut 35 being screwed in an internal screw thread 36 in the outer sleeve 30 and the inner nut 34 together with a counter nut 37 being screwed on to the external threaded portion of the screw spindle 10.

A scale drum is slipped from the rear on to the rear end of the outer sleeve 30. This drum consists of a scale-carrying sleeve 39 the outer surface of which is flush with the outer surface of the wall of the outer sleeve 30, and of a bottom 40 introduced at the rear end which is rigidly connected with the scale-carrying sleeve 39. The bottom 40 is slipped on to the neck portion 22 of the screw spindle 14 and rigidly connected therewith. It has in its periphery an annular groove 41 in which grub clamping screws 42 engage which are screwed into the scale-carrying sleeve 39 for setting this sleeve.

A sleeve-like counting mechanism housing 50 is slipped from the front end into the outer sleeve 30 and has at its rear end an inwardly directed flange 51 forming a partition. A number drum carrier sleeve 52 is introduced into the counting mechanism housing 50 from the front end and rigidly connected therewith. A shaft 55 is mounted in the number drum carrier sleeve 52 parallel with the measuring spindle 10 and three indexing pinions 56, 57 and 58 are rotatably mounted on this shaft one behind the other. These pinions mesh with the internal teeth of three ring counter wheels 59, 60, 61 likewise arranged one following the other and rotatably slipped on to the number drum carrier sleeve 52 from the rear, each of these counter wheels being provided with internal flanges 59', 60' and 61' of the same height as their internal toothing. Each of the counter wheels 59, 60, 61 has on its outer periphery a ring of figures numbering twice from 0 to 9. A disc-shaped counter wheel 62 is slipped on to the number drum carrier sleeve 52 from the rear to form the bottom of the sleeve, and carries on its rearwardly projecting hub a toothed rim 63. Engaging this toothed rim 63 is a pinion 64 which is keyed on a shaft mounted in the partition flange 51 of the counting mechanism housing 50 and carrying behind this flange a second pinion 65 in mesh with the teeth of a driving wheel 66.

This driving wheel is slipped tightly on the collar 18 of the screw spindle 14.

Two grub screws 67, radially mounted in the hub of the driving wheel 66 engage with their conical ends in the annular groove 19 in the collar 18 of the screw spindle 14 and can be adjusted from the outside with the aid of a screwdriver inserted through a hole in the wall of the outer sleeve 30. The screws 67 set the disc-shaped driving wheel 66.

Two countersunk head screws 69 in the wall of the outer sleeve 30 secure the counting mechanism housing 50 together with the number drum carrier sleeve 52 against shifting in relation to each other within the outer sleeve 30.

In the wall of the outer sleeve 30 a window 70 is provided which is covered by a magnifying lens 71.

A locking device 80 for the measuring spindle 10 is mounted on the front end of the outer sleeve 30. According to the invention, three longitudinal grooves 80, 80', 80'' are cut in the outer surface of the wall of the measuring spindle guide housing 11 distributed uniformly in a circle. Fitting loosely in these grooves are pressure rods 81, 81', 81''. These grooves 80 with the pressure rods 81 fitting loosely therein are covered on the outer side by the outer sleeve 30. The pressure rods 81 extend right into the front end of the scale-carrying sleeve 39 and their rear ends bear against a pressure ring 82 slidable on the reduced rear end of the outer sleeve 30. The rear end face of this ring is bevelled and bears against a split braking expanding ring 83 the rear end face of which is inversely bevelled to its front end face. The outer wall surface of the expanding ring 83 comes into contact with the inner side of the scale-bearing sleeve 39. The bevelled front end face of a rear pressure ring 84 inversely slidable on the reduced portion of the outer sleeve 30 presses against the rear bevelled end face of the expanding ring 83, the pressure ring being secured against shifting in rearward direction by a spring ring 85 bearing against the periphery of the outer sleeve. A screw ring 86, which can be screwed on to an external screw thread 87 on the spindle guide housing 11, presses with its rear end face against the front end face of the three pressure rods 81. A spring ring 88 locks the screw ring 86 against unintentional unscrewing towards the front. An annular disc 89 is fitted in the screw ring 86 at the back for the purpose of reducing friction between the rear end of the pressure rods and the screw ring 86.

The tubular measuring spindle 10 is closed at its front end by a pressed-in fitting 90.

The measuring spindle-guide housing 11 has at its front end an external screw thread 91 behind which the housing 11 is machined at 92 to form a seat for the arm or jaw 93 which is provided with a suitable bore or, in the case of built-in micrometers, for the existing receptacle for the gauge which can be slipped on to this seat and secured in position by a nut 94 on the screw thread 91. Thus different exchangeable jaws 93 or receptacles can be used.

An area or field 53 is also provided on the cover pane 71 of the window in front of the tens field for a supplementary notation, for example a type designation indicating, for example, the measuring range.

The outer sleeve 30 and the measuring spindle-guide housing 11 are held together by countersunk flat head screws.

The new counter-micrometer operates in the following manner:

When the jaw 93 has been placed on the workpiece to be measured, the spindle 14 is turned in its ball bearings 32 by turning the ratchet 23. The measuring spindle 10 rides forward on the screw spindle until its fitting 90 in its front end comes into contact with the workpiece. The screw spindle 14 entrains the driving disc-shaped toothed wheel 66 which rotates the pinions 65 and 64 mounted on a common shaft. The pinion 64 rotates the disc-shaped counter wheel 62 which carries on its periphery the number ring for the hundredths division. The pinions 58, 57, 56 are the tens transfer gears so that the tenths, the integers and the tens of the measuring units appear on the toothed rims of the counter wheels 61, 60, 59 behind the reading window. The scale 72 on the scale drum 39 corresponds with the hundredths scale on the disc-shaped counter wheel 62 and has turned with the screw spindle. The thousandths of the measuring unit can now be read on the stationary vernier scale 73 on the outer sleeve 30. Before removing the gauge from the workpiece the rotatable ring 86 on the front of the guide sleeve 11 is turned slightly to operate the setting or locking device 80. The pressure rods 81 shift the pressure ring 82 and this pushes the expanding ring 83 on the rear pressure ring 84 so that the expanding ring 83 will be expanded and pressed against the inner wall of the outer sleeve 30, thereby reliably locking the measuring spindle 10.

I claim:

1. Counter-micrometer with slidable, non-rotatable tubular measuring spindle, comprising a rotatable, non-slidable screw spindle in threaded engagement within the tubular spindle, an outer sleeve around the spindle, a bearing for the screw spindle and consisting of two ring-shoulder ball bearings fitted in the outer sleeve and arranged side by side so that the measuring pressure is taken up by them in both directions, a spur wheel mounted on the screw spindle in which a counter-mechanism drive with a first pinion is provided, the spur wheel meshing with the first pinion.

2. Counter-micrometer with slidable, non-rotatable tubular measuring spindle, comprising a rotatable, non-slidable screw spindle in threaded engagement within the tubular spindle, an outer sleeve around the spindle, a bearing for the screw spindle and consisting of two ring-shoulder ball bearings fitted in the outer sleeve and arranged side by side so that the measuring pressure is taken up by them in both directions, a sleeve-like housing in the outer sleeve, a counting mechanism having number drums and in the form of a unit accommodated in the sleeve-like housing slipped in the outer sleeve, and a carrier sleeve in the sleeve-like housing for the number drums.

3. Counter-micrometer according to claim 2, in which a shaft is provided mounted in the number drum carrier sleeve parallel to the measuring spindle and in which indexing pinions are provided for driving the number drums and arranged in a row on said shaft.

4. Counter-micrometer comprising a slidable and non-rotatable measuring spindle having a tubular configuration, an outer sleeve around the spindle, a counter mechanism with number drums in the form of a unit, a sleeve-like housing in the outer sleeve, a carrier sleeve for the plurality of number drums, a shaft mounted in the number drums carrier sleeve, indexing pinions for driving the number drums and arranged in a row on said shaft, a disc-shaped counter wheel with teeth on its hub meshing with an end pinion of the counting mechanism drive.

5. Counter-micrometer with slidable, non-rotatable tubular measuring spindle, comprising a rotatable, non-slidable screw spindle in threaded engagement within the tubular spindle, an outer sleeve around the spindle, a bearing for the screw spindle and consisting of two ring-shoulder ball bearings fitted in the outer sleeve and arranged side by side so that the measuring pressure is taken up by them in both directions, the measuring spindle in retracted position being drawn back with its screw threaded rear end which carries a fine adjustment sleeve nut in the counting mechanism.

6. Counter-micrometer with slidable non-rotatable tubular measuring spindle, comprising a rotatable, non-slidable screw spindle in threaded engagement within the tubular spindle, an outer sleeve around the spindle, a bearing for the screw spindle and consisting of two ring-shoulder ball bearings fitted in the outer sleeve and arranged side by side so that the measuring pressure is taken up by them in both directions, and a scale carrying drum rigidly mounted on the rear end of the screw spindle, the body of the drum bearing against the rear end of the outer sleeve being flush with its outer surface with the outer surface of the outer sleeve so that a vernier scale outside on the edge thereof ensures a parallax-free reading with the hundredths scale outside on the scale carrying the drum.

7. Counter-micrometer with slidable, non-rotatable tubular measuring spindle, comprising a rotatable, non-slidable screw spindle in threaded engagement within the tubular spindle, an outer sleeve around the spindle, a bearing for the screw spindle and consisting of two ring-shoulder ball bearings fitted in the outer sleeve and arranged side by side so that the measuring pressure is taken up by them in both directions, two pressure rings and a split braking ring are provided as a locking device and each with bevelled end faces and slidably mounted on a reduced rear end of the outer sleeve, the opposed bevelled end faces of the rings receiving between them the split braking ring with the correspondingly bevelled end faces, whereby one of the pressure rings is secured against shifting, and in which a plurality of loosely slidable pressure rods are provided uniformly distributed in a circle and bearing against the front end face of the other pressure ring.

8. Counter-micrometer with slidable, non-rotatable tubular measuring spindle, comprising a rotatable, non-slidable screw spindle in threaded engagement within the tubular spindle, an outer sleeve around the spindle, a bearing for the screw spindle and consisting of two ring-shoulder ball bearings fitted in the outer sleeve and arranged side by side so that the measuring pressure is taken up by them in both directions, two pressure rings and a split braking ring are provided as a locking device and each with bevelled end faces and slidably mounted on a reduced rear end of the outer sleeve, the opposed bevelled end faces of the rings receiving between them the split braking ring with the correspondingly bevelled end faces, whereby one of the rear pressure rings is secured against shifting, and in which a plurality of loosely slidable pressure rods are provided uniformly distributed in a circle and bearing against the other end face of the front pressure ring, the pressure rods being loosely fitted in longitudinal grooves in the wall of the measuring spindle guide sleeve and the counting mechanism housing and abut at their front ends against the rear face of a set screw ring which is screwable on a length of external thread on the spindle guide housing and secured against unintentional unscrewing.

9. Counter-micrometer with slidable, non-rotatable tubular measuring spindle, comprising a rotatable, non-slidable screw spindle in threaded engagement within the tubular spindle, an outer sleeve around the spindle, a bearing for the screw spindle and consisting of two ring-shoulder ball bearings fitted in the outer sleeve and arranged side by side so that the measuring pressure is taken up by them in both directions, a gauge jaw provided with a hole in one of its arms and is slipped on to the front end of the measuring spindle guide housing located in front of the locking device and is held in position by means of a nut screwed on to the foremost screw threaded end of the measuring spindle guide housing.

10. Counter-micrometer with slidable, non-rotatable tubular measuring spindle, comprising a rotatable, non-slidable screw spindle in threaded engagement within the tubular spindle, an outer sleeve around the spindle, a bearing for the screw spindle and consisting of two ring-shoulder ball bearings fitted in the outer sleeve and arranged side by side so that the measuring pressure is taken up by them in both directions, a measuring spindle guide housing and a locking device is provided on a front end of the measuring spindle guide housing for the measuring spindle.

References Cited in the file of this patent

UNITED STATES PATENTS

| | | |
|---|---|---|
| 729,970 | Spalding | June 2, 1903 |
| 981,127 | Scusa | Jan. 10, 1911 |
| 1,107,202 | Savage | Aug. 11, 1914 |
| 2,111,869 | Montgomery | Mar. 22, 1938 |
| 2,232,159 | Blood | Feb. 18, 1941 |
| 2,273,956 | Hall | Feb. 24, 1942 |

FOREIGN PATENTS

| | | |
|---|---|---|
| 79,518 | Switzerland | Dec. 2, 1918 |